United States Patent
Packer (10) Patent No.: US 6,373,794 B2
(45) Date of Patent: Apr. 16, 2002

(54) METHODS AND APPARATUS FOR DELAYED BLOCK RELEASE IN COMPACT DISC SYSTEMS

(75) Inventor: John S. Packer, San Jose, CA (US)

(73) Assignee: STMicroelectronics N.V. (NL)

( * ) Notice: Subject to any disclaimer, the term of this patent is extended or adjusted under 35 U.S.C. 154(b) by 0 days.

(21) Appl. No.: 09/765,837

(22) Filed: Jan. 19, 2001

Related U.S. Application Data (62) Division of application No. 08/914,382, filed on Aug. 18, 1997.

(51) Int. Cl.[7] .............................................. G11B 17/22
(52) U.S. Cl. ................................ 369/30.23; 369/59.26; 714/769
(58) Field of Search ........................ 369/33, 32, 59.76, 369/47.1, 47.15, 47.21, 59.1; 714/769, 763, 764, 768

(56) References Cited

U.S. PATENT DOCUMENTS

| | | | |
|---|---|---|---|
| 4,682,317 A | 7/1987 | Tomisawa ..................... 369/59 |
| 4,994,925 A | 2/1991 | Yamashita et al. ........... 358/343 |
| 4,996,679 A | 2/1991 | Yoshio ......................... 369/33 |
| 5,054,359 A | 10/1991 | Hikawa ........................ 84/645 |
| 5,226,046 A | 7/1993 | Hanson ..................... 370/105.4 |
| 5,249,166 A | 9/1993 | Hamilton et al. ............. 369/32 |
| 5,295,124 A | 3/1994 | Shirako ........................ 369/32 |
| 5,315,400 A | * 5/1994 | Kurata et al. ............. 369/275.3 |
| 5,397,853 A | 3/1995 | Koguchi ....................... 84/609 |
| 5,465,244 A | 11/1995 | Kobayashi et al. ........... 369/50 |
| 5,508,983 A | 4/1996 | Nakamura et al. ............ 369/32 |
| 5,551,054 A | 8/1996 | Packer ....................... 395/843 |
| 5,721,856 A | * 2/1998 | Takeuchi ..................... 369/32 |
| 5,818,801 A | 10/1998 | Watanabe et al. ............. 369/33 |
| 5,931,921 A | 8/1999 | Kyle ............................ 710/29 |
| 5,970,031 A | 10/1999 | Huang et al. ............. 369/44.28 |
| 6,058,453 A | 5/2000 | Packer ........................ 369/33 |
| 6,064,634 A | 5/2000 | Packer ........................ 369/33 |

OTHER PUBLICATIONS

Prof. Kelin J. Kuhn, "Audio Compact Disk—Writing and Reading the Data," EE 498, pp. 1–9, 1990, Time–Life Books, Alexandria, VA.
Prof. Kelin J. Kuhn, "Audio Compact Disk—An Introduction," EE 498, pp. 1–8, 1990, Time–Life Books, Alexandria, VA.
Denise G. Howe, "Compact Disc Direct Access Storage Disc (CD–DASD)", pp. 1–16, Rev. 1.1, Jan. 25, 1996, Optical Storage Data Center, Tucson, AZ.
Daniel Ewing, "Clickable Imagemap of a CD Player," Rev. ed., 1990, Time–Life Books, Alexandria, VA.
Unknown, "Subcode on the Compact Disk," pp. 1–3, 1990, Time–Life Books, Alexandria, VA.

* cited by examiner

*Primary Examiner*—Tan Dinh
(74) *Attorney, Agent, or Firm*—Lisa K. Jorgenson; Steven H. Slater (57) ABSTRACT

Disclosed is a disc drive system that includes a digital signal processor for processing information sectors read from a CD media. The digital signal processor is configured to parse the information sectors into data frames and subcode frames. A data auto-start unit for triggering a data transfer to a buffer memory when a desired data frame is detected. A subcode auto-start unit for triggering a subcode transfer to the buffer memory when a desired subcode frame is detected. Preferably, the desired data frame and the desired subcode frame have a same MSF. The disc drive system further includes a buffer manager having a plurality of counters that are configured to track the number of data frames and the number of subcode frames being transferred to the buffer memory, and releasing a block including one of the data frames and one of the subcode frames when the counters indicate that the block is complete.

19 Claims, 5 Drawing Sheets

| | COUNTERS | UNRELEASED FRAME NUMBER | COUNTER STATUS | BCTR (COMPLETE BLOCKS) | |
|---|---|---|---|---|---|
| R1 | DD<br>DS<br>E | 20<br>20,21,22 | 1<br>3<br>1 | 0 | |
| R2 | DD<br>DS<br>E | 0<br>21,22 | 0<br>2<br>0 | 1 | ← BLOCK "20" RELEASE |
| R3 | DD<br>DS<br>E | 21<br>21,22,23 | 1<br>3<br>1 | 1 | |
| R4 | DD<br>DS<br>E | 0<br>22,23 | 0<br>2<br>0 | 2 | ← BLOCK "21" RELEASE |
| R5 | DD<br>DS<br>E | 22<br>22,23,24 | 1<br>3<br>1 | 2 | |
| R6 | DD<br>DS<br>E | 0<br>23,24 | 0<br>2<br>0 | 3 | ← BLOCK "22" RELEASE |
| R7 | DD<br>DS<br>E | 23<br>23,24 | 1<br>2<br>1 | 3 | |
| R8 | DD<br>DS<br>E | 0<br>24 | 0<br>1<br>0 | 4 | ← BLOCK "23" RELEASE |
| R9 | DD<br>DS<br>E | 24<br>24 | 1<br>1<br>1 | 4 | |
| R10 | DD<br>DS<br>E | 0<br>0 | 0<br>0<br>0 | 5 | ← BLOCK "24" RELEASE |

METHODS AND APPARATUS FOR DELAYED BLOCK RELEASE IN COMPACT DISC SYSTEMS

CROSS REFERENCE TO RELATED APPLICATIONS

This application is a divisional of U.S. patent application Ser. No. 08/914,382, filed Aug. 18, 1997 and entitled Method and Apparatus for Delayed Block Release in Compact Disc Systems.

This application is related to the following U.S. patent applications: (1) Ser. No. 08/914,296 filed on Aug. 18, 1997, and entitled "Methods and Apparatus For Compact Disc Automatic Start", and (2) Ser. No. 08/914,298, filed on Aug. 18, 1997, and entitled "Method and Apparatus for Subcode/Data Synchronization in a Compact Disc System". These applications are hereby incorporated by reference.

BACKGROUND OF THE INVENTION

1. Field of the Invention

This invention relates generally to compact discs, and more particularly to efficient integrated circuit processing of sector components in high speed compact disc drives.

2. Description of the Related Art

Compact disc drives have become increasingly popular due to their ability to rapidly access large quantities of data as well as provide fine quality digital play-back. To meet the need for increased data transfer rates, compact disc "CD" hardware engineers have been designing CD drives that are able to transfer data at speeds that are many times the rotational speed of normal audio CD audio (e.g., 4×, 10×, 24×, . . . 50×. . . etc.). For example, when a CD contains normal audio, the processing and play-back of the audio data is performed at 1× speeds. Accordingly, CD drives must be capable of operating at various speeds in order to appropriately process the data contained on a CD media, whether the CD media contains pure audio data or some other type of stored data.

Although there are many types of CD drives that provide different rotational speeds depending on the type of CD media being read, a new type of CD drive, which is capable of maintaining a constant high rotational speed irrespective of what the CD media has stored therein has recently been developed. The various advantages of such CD drives are discussed in greater detail in a co-pending U.S. Patent application entitled "An Improved Disc Drive", and having U.S. Ser. No. 08/917,792, which is incorporated by reference herein. Because the CD is now capable of rotating at a constant high speed, the CD drive must be capable of reading and processing the data stored on the CD sufficiently fast to avoid introducing delays.

A common technique for increasing processing speeds has been to incorporate faster microprocessors, however, even fast processors have found reading and processing the CD media being spun at ever increasing speeds a challenge. By way of example, basic CD drive tasks, such as "seeking" to a location on the CD media in order to start play-back, are becoming increasingly difficult. In some cases, the microprocessor that is in charge of seeking to a particular "start" location on a CD media track has been found to be too slow to begin a play-back once the start location has been identified. That is, by the time the microprocessor determines that it has the correct start location, the CD media will have spun past its appropriate starting location. Many times, play-back may not start until a next sector is encountered.

Figure 1A:
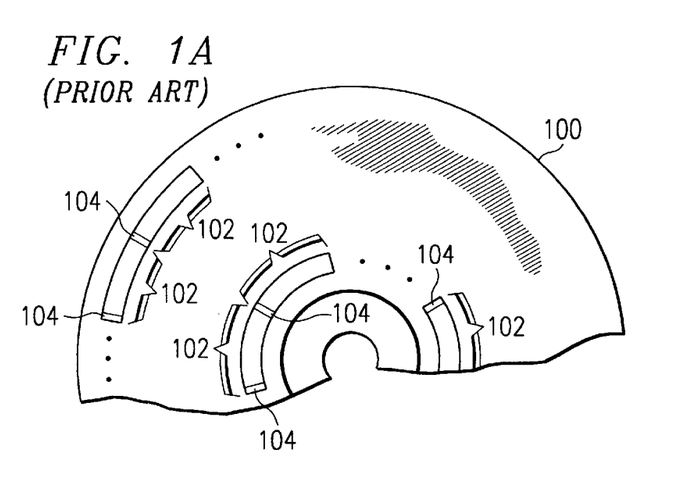
FIGS. 1A through 1C illustrate conventional techniques used to store data on a CD media.
Figure 1B:
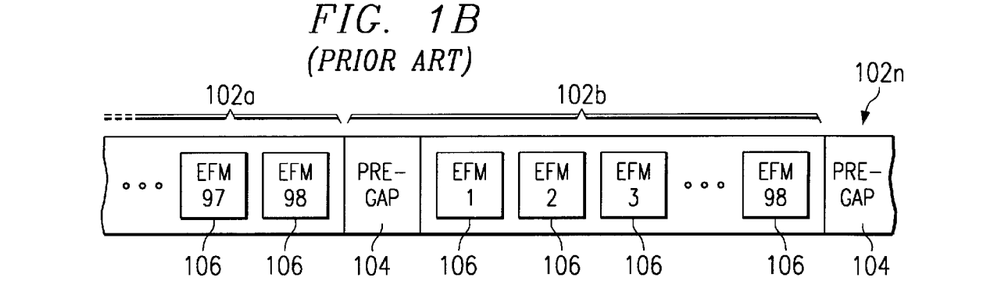
Figure 1C:
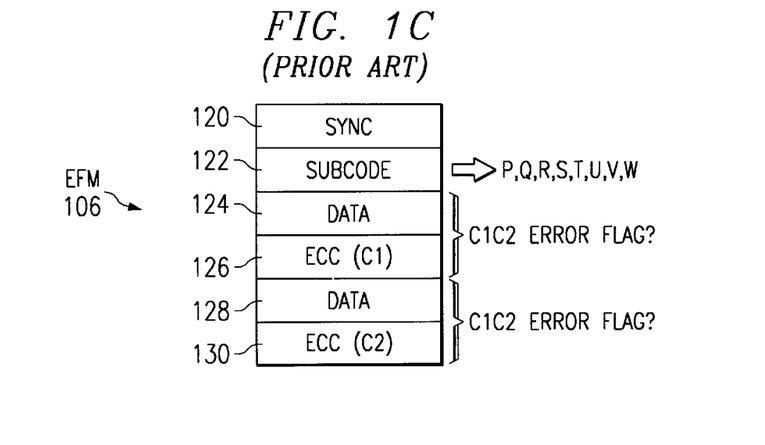

FIGS. 1A through 1C illustrate, by way of background, techniques used to store data on a CD media 100. As is well known, the CD media 100 has a continuous track that spirals around the CD media 100, beginning at the inner region and ending at the outer edge. At the beginning of the track, a lead-in region typically contains a table of contents (TOC) that is used by the CD drive to ascertain where data recorded on the CD media 100 is located, in terms of minutes, seconds and frames (i.e., MSFs). As shown, the track of the CD media 100 is divided into many sectors 102, where each sector 102 contains 2352 bytes of data. The final sector 102 of the CD media 100 is then followed by a lead-out region, which signals the end of the CD media 100.

Besides the 2352 bytes of data, each sector also includes 98 subcode bytes, such that there are 98 bits of P-subcode, 98 bits of Q-subcode, 98 bits of R-subcode, 98 bits of S-subcode, 98 bits of T-subcode, 98 bits of U-subcode, 98 bits of V-subcode, and 98 bits of W-subcode. As is well known, each of these subcode bits may be used for a number of identification purposes, however, only the 98 bits of Q-subcode are used to ascertain the absolute subcode MSF of a particular sector 102. Of course, the Q-subcode is sometimes used for other processing and identification purposes as well.

FIG. 1B provides a closer examination of the typical contents of a sector that may be stored on a disc track. For example, each sector 102a–102n will typically contain a pre-gap region 104 that is typically used as a silent region. Generally, when the information stored on the disc is non-audio data, there is also a post-gap region (not shown), which may be silent or include some type of control information. Each sector 102a–102n also contains 98 "eight-to-fourteen modulation" (EFM) frames 106 that have both data and subcode components. As shown in FIG. 1C, each EFM frame 106 typically contains a SYNC field 120, a subcode field 122, a data field 124, an ECC (C1) field 126, a data field 128 and an ECC (C2) field. When an error in the data 124 or 128 is detected, a C1C2 Error Flag is triggered, thereby indicating that at least one of the data components 124 or 128 contain an error. In addition, because a sector 102 has 98 bytes of subcode, each EFM frame will contain 8 bits of subcode (i.e., a P-bit, a Q-bit, an R-bit, an S-bit, a T-bit, a U-bit, a V-bit, and a W-bit).

In operation, when a user wants to seek out to a particular subcode MSF on the CD media, a head actuator (not shown) moves an optical reading head to the radial position where the desired data is believed to be located. To identify the location, the optical reading head is required to sequentially read out one Q-bit at a time from a sector 102 until all 98 Q-bits have been read. Once all 98 Q-bits are read, the CD drive must perform microprocessor operations to determine whether those 98 Q-bits define a subcode MSF that is equal to the desired subcode MSF. Once the microprocessor determines that the subcode MSF values match, the CD drive must be quick enough to start the transfer of subcode data.

As mentioned earlier, as disc speeds continue to increase, the microprocessors that are assigned the task of processing the 98 bytes of subcode for each sector 102, will find it challenging, if not impossible, to begin the data transfer before the next sector is encountered. Referring to FIG. 1B, after all 98 bytes of subcode for sector 102a have been read by the CD drive, and the microprocessor performs the necessary operations to determine that sector 102a has the correct subcode MSF it was looking for (i.e., the found subcode MSF), the microprocessor is required to initiate the "start" of a subcode data transfer. However, even the fastest of microprocessors will experience that processing and finding the correct subcode MSF, and triggering a start after the correct subcode MSF is actually found is difficult without introducing delays.

Typically, when the data stored on the CD media 100 is other than audio, the data component also has its own associated MSF. However, typical CD drives internally separate a sector 102 that has just been read, into a subcode component and a data component. Unfortunately, these components are often times released from a holding buffer memory with offsets. For example, if the CD drive receives a subcode component having a subcode $MSF_1$ at time $t_1$ and a data component having a data $MSF_1$ at time $t_2$, the subcode component will necessarily be released before the data component. Although they have the same $MSF_1$, they are received by the holding buffer memory at different times (e.g., at $t_1$ and $t_2$), and therefore, an offset is necessarily introduced. Although the offset may be attributed to a number of factors, one reason for the offset is that the subcode or the data components were processed through the CD drive logic and microprocessor at different speeds.

In situations where the data stored in the CD media 100 is graphics related, many times graphics information may be coded directly into the subcode (e.g., using at least some of the R-W bits). Consequently, if the subcode component is released before the data component, the data that is designed to interact with the subcode graphics will not match up. This problem is sometimes further complicated when offsets of several frames are produced, which may introduced playback errors or degrade the quality of the data being read.

In view of the foregoing, there is a need for a compact disc drive that is capable of detecting when the data and subcode components are received, and temporarily delaying transfers until the correct components are matched up.

SUMMARY OF THE INVENTION

Broadly speaking, the present invention fills these needs by providing a method and apparatus for managing the various components associated with a transfer from a CD media to a host, or from the host to the CD media in CD-R applications. In a further embodiment, the managing functions are simplified by including a plurality of counters that are in charge of counting the status of the various components being received by a buffer memory. Accordingly, the plurality of counters provide a method by which a block of information is not released to the host until its components are received by the buffer memory. It should be appreciated that the present invention can be implemented in numerous ways, including as a process, an apparatus, a system, a device, a method, or a computer readable medium. Several inventive embodiments of the present invention are described below.

In one embodiment, a disc drive system is disclosed. The disc drive system includes a digital signal processor for processing information sectors read from a CD media. The digital signal processor is configured to parse the information sectors into data frames and subcode frames. The system includes data auto-start unit for triggering a data transfer to a buffer memory when a desired data frame is detected, and a subcode auto-start unit for triggering a subcode transfer to the buffer memory when a desired subcode frame is detected. Preferably, the desired data frame and the desired subcode frame have a same MSF. The disc drive system further includes a buffer manager having a plurality of counters that are configured to track the number of data frames and the number of subcode frames being transferred to the buffer memory, and releasing a block including one of the data frames and one of the subcode frames when the counters indicate that the block is complete.

In another embodiment, a method for releasing data processed in a disc drive system is disclosed. The method includes processing information sectors read from a CD media to produce data frames and subcode frames, triggering a data transfer to a buffer memory when a desired data frame is detected, and triggering a subcode transfer to the buffer memory when a desired subcode frame is detected. The method further includes tracking the number of data frames and the subcode frames being transferred to the buffer memory, and releasing a block including one of the data frames and one of the subcode frames contained in the buffer memory, wherein the block has the same minute/second/frame parameter for the one data frame and the one subcode frame.

In yet a further embodiment, a disc drive apparatus is disclosed. The disc drive apparatus includes a signal processing means for processing information sectors read from a CD media. The signal processing means is configured to parse the information sectors into data frames and subcode frames. The apparatus includes a data auto-starting means for triggering a data transfer to a memory means when a desired data frame is detected, and subcode auto-starting means for triggering a subcode transfer to the memory means when a desired subcode frame is detected, such that the desired data frame and the desired subcode frame have a same MSF. The disc drive apparatus further includes a memory managing means having a plurality of counters that are configured to track the number of data frames and the subcode frames being transferred to the memory means, and releasing a block including at least one of the data frames and one of the subcode frames when the counters indicate that the block is complete.

These and other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF TIE PREFERRED EMBODIMENTS

An invention is described for a method and apparatus for managing components associated with information being transferred between a CD media and a host. In one embodiment, the managing functions are carried out with the aid of a plurality of buffer counters that are responsible for counting the status of the various components being received by a buffer memory. Further, the plurality of counters are well suited to assist in delaying the release of the components until predetermined counter conditions are established. In the following description, numerous specific details are set forth in order to provide a thorough understanding of the present invention. It will be obvious, however, to one skilled in the art, that the present invention may be practiced without some or all of these specific details. In other instances, well known process operations have not been described in detail in order not to unnecessarily obscure the present invention.

Figure 2:
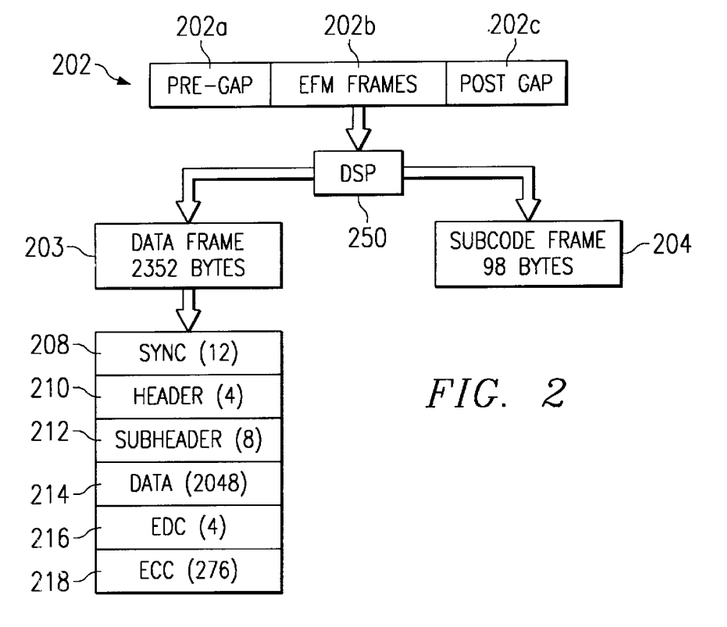
FIG. 2 is block diagram illustrating the parsing of a sector into a data frame and a subcode frame in accordance with one embodiment of the present invention.

FIG. 2 is block diagram illustrating the separation of data and subcode of a sector 202 in accordance with one embodiment of the present invention. As shown, the sector 202 typically includes a pre-gap region 202a, an EFM frame region 202b, and a post-gap region 202c. As is well known, the pre-gap region 202a and the post-gap region 202c may be used as silent transition regions in between successive sectors on a CD media, and the EFM region 202b typically includes 98 EFM frames, such as those described in FIG. 1C above. As pictorially illustrated, the sector 202 is processed through a digital signal processor (DSP) 250 where the EFM frames are parsed in order to separate the data portions from the subcode portions.

By way of example, the DSP 250 is preferably well suited to separate the data to produce data frames 203 having 2352 bytes each. The subcode part is likewise arranged to produce subcode frames 204 having 98 bytes each. The data frames 203 may be further broken down into a number of sub-components. The sub-components include a SYNC 208 (12 bytes), a header (4 bytes) 210, a Subheader (8 bytes) 212, a Data block (2048 bytes) 214, an EDC (4 bytes) 216, and an ECC (276 bytes) 218. Because the data frame 203 contains the SYNC 208, the header 210 and the subheader 212, searches for a minutes, seconds and frames (MSFs) of the data are also possible. This is in contrast to CD mediums that only hold "pure sampled audio" data, where it is only possible to search to an MSF decoded from the Q-bits of the subcode. Accordingly, the following discussion will assume that the data may be both audio and non-audio data, and that MSF searches are possible in both the data frames 203 and the subcode frames 204.

Figure 3:
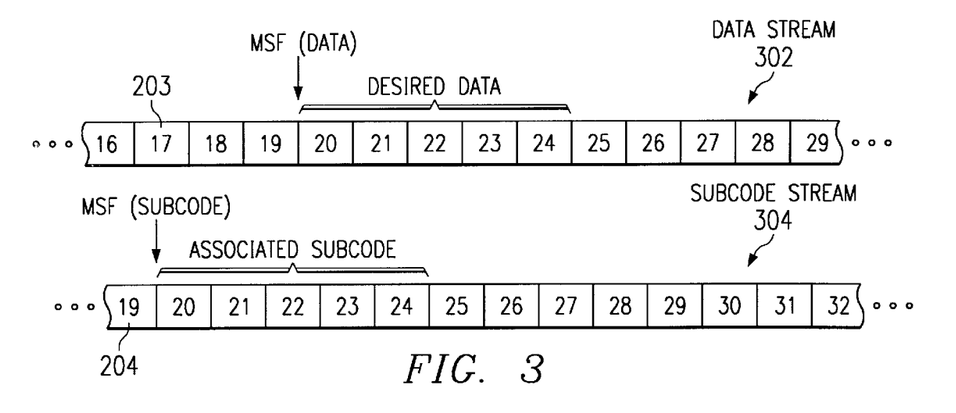
FIG. 3 illustrates a data stream and a subcode stream, each having a plurality of data frames and subcode frames, respectively, in accordance with one embodiment of the present invention.

With this in mind, FIG. 3 illustrates a data stream 302 and a subcode stream 304, each having a plurality of data frames 203 and subcode frames 204, respectively, in accordance with one embodiment of the present invention. The data stream 302 and the subcode stream 304 are numbered with exemplary frame numbers to more clearly illustrate the offsets that occur within the DSP 250 as a typical disc drive outputs the corresponding streams. In prior art disc drive systems, when a user selects data frames 20 through 24 to play-back, down load or read, the disc drive system would identify a data MSF of data frame 20. Unfortunately, the disc drive system often times selects the closest corresponding subcode frame, in this case, subcode frame 22 would be selected and output as a block with data frame 20. In some cases, the offset can be even more severe, ranging up to several frames.

In one embodiment of the present invention, when a user selects data frames 20 through 24, the disc drive system will be well suited to associate those data frames with the corresponding subcode frames 20 through 24, with the implementation of a delayed block release operation. Preferably, the delayed block release may be implemented through the use of a plurality of buffer counters.

Figure 4:
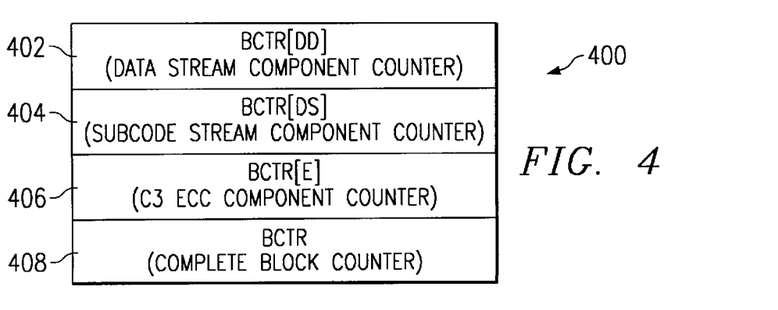
FIG. 4 illustrates the exemplary buffer counters used to implement the delayed block release in accordance with one embodiment of the present invention.

FIG. 4 illustrates the buffer counters 400 used to implement the delayed block release in accordance with one embodiment of the present invention. The buffer counters 400 include a data stream component counter (BCTRDD "DD") 402, a subcode stream component counter (BCTRDS "DS") 404, a C3 ECC (BCTRE "E") component counter 406, and a complete block counter (BCTR) 408. In one embodiment, the DD counter 402 is used to count the data frames 203 after a data MSF has been found in the data stream 302. In a like manner, the DS counter 404 is used to count the subcode frames 204 after a subcode MSF has been found in the subcode stream 304. Although only four exemplary counters are used in one embodiment of the present invention, it should be understood that any number of counters may be implemented to keep tack of other components associated with the data stream 302 or subcode stream 304.

Figure 5A:
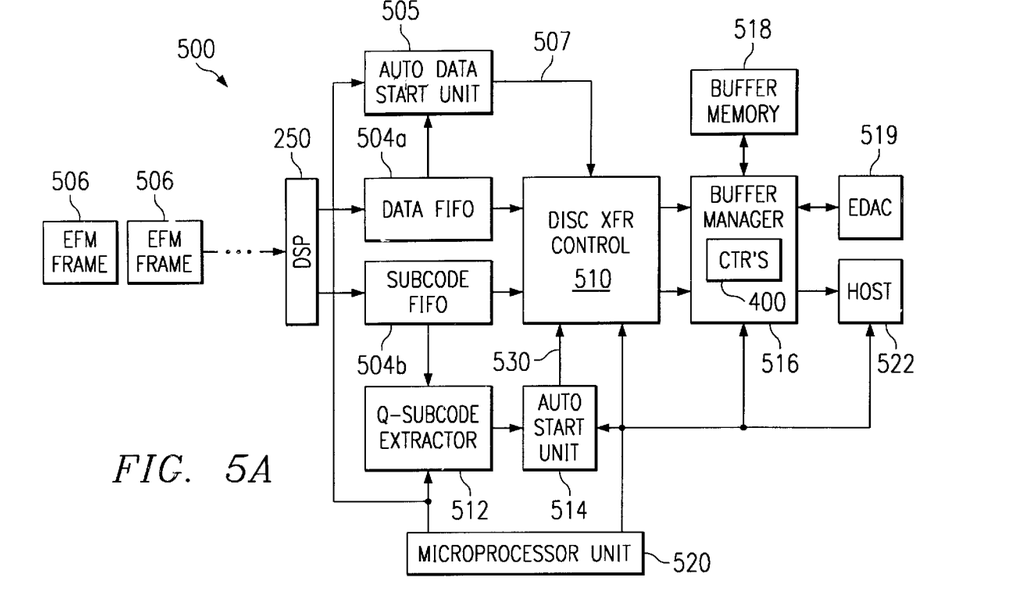
FIG. 5A is a system diagram of the functional blocks contained within a disc drive system in accordance with one embodiment of the present invention.

FIG. 5A is a system diagram of the functional blocks contained within a disc drive system 500 in accordance with one embodiment of the present invention. In operation, the digital signal processor 250 is configured to sequentially receive eight-to-fourteen modulation "EFM" frames 506 in order to process the subcode and data information contained within each EFM frame as described with reference to FIG. 2 above. As EFM frames are received by the digital signal processor 250, a parsing is performed, such that the data frames 203 are transferred out to a data first-in-first-out (FIFO) 504a, and the subcode frames 204 are transferred out to a subcode first-in-first-out (FIFO) 504b.

At this point, the subcode will have been separated from the data portion of the EFM frames 506, and therefore, FIFO 504b may contain eight bits of subcode (i.e., P, Q, R, S, T, U, V, and W subcode bits) that are associated with each EFM frame 506. In a like manner, the FIFO 504a may contain 24 bytes of data that are also associated with each EFM frame 506. In this embodiment, a Q-subcode extractor 512 is preferably implemented to extract the Q-subcode bit from each EFM frame received by the subcode FIFO 504b. In this manner, the subcode extractor 512 will be well suited to feed an auto-start unit 514 each of the "98 Q-bits" associated with a particular sector 202 that may be in the process of being read from a compact disc (CD) media.

In a preferred embodiment of the present invention, the auto-start unit 514 is a state machine that is configured to accept the Q-bits being extracted from each EFM frame by the DSP 250, and channeled to the subcode FIFO 504b. Accordingly, when the auto-start unit 514 has received each of the 98-Q bits for a particular sector, the auto-start unit will automatically compare a minute/second/frame (MSF) parameter programmed into the 98-Q bits of the particular sector with a desired MSF that has been requested by a microprocessor unit 520. For more information on the auto-start features of the disc drive system 500, reference may be made to the previously incorporated by reference U.S. patent application having Ser. No. 08/914,926.

By way of example, if a user desires to locate a particular subcode MSF (e.g., the MSF for subcode frame 20 of FIG. 3) on a CD media, the microprocessor unit 520 will know the exact MSF for that desired location based on a prior reading of a table of contents (TOC) contained in a lead-in region of the CD media. Accordingly, when the auto-start unit 514 identifies a frame (i.e., 98 bits) of Q-subcode that matches the user desired MSF location, the auto-start unit 514 will automatically transmit a control signal 530 to a disc transfer controller 510. As shown, the disc transfer controller 510 is configured to receive the subcode frames 204 previously partitioned by the DSP 250 and stored in the data FIFO 504b.

Accordingly, when the disc transfer controller 510 receives the control signal 530 from the auto-start unit 514, the subcode stored in the data FIFO 504b will be transferred to a buffer manager 516. The buffer manager 516 in turn transfers that data to a buffer memory 518, provided the buffer memory has sufficient space to accept the transfer. When each subcode frame 204 (i.e., the 98 bytes of each sector) is passed into the buffer memory 518, the DS counter 404 will be incremented by "1".

In a similar manner, an auto-data start unit 505 is shown in communication with the data FIFO 504a, which enables it to detect when a desired data MSF is passed out by the DSP 250. By way of example, the auto-data start unit 505 is preferably a state machine that is configured to compare incoming data MSF's with a desired MSF provided by the microprocessor unit 520. When the desired data MSF is detected, the auto-data start unit 505 will automatically provide a signal 507 to the disc transfer controller 510 indicating that it is time to begin transferring the data within the data FIFO 504a to the buffer memory 518. For example, when the MSF for data frame 20 is encountered, the auto-data start unit 505 will automatically trigger the transfer beginning with frame 20.

As mentioned above, when data frames 203 (i.e., the 2352 bytes of data) are transferred to the buffer memory 518 by the buffer manager 516, a the DD counter 402 is incremented by "1". As illustrated, the counters mentioned in FIG. 4 are preferably contained within 400 of the buffer manager 516, to enable the buffer manager to track the status of the incoming components. As mentioned above, the buffer manager 516 will also include the E counter 406 for counting a passing C3 ECC result, and a BCTR counter 408 for counting the number of complete blocks contained within the buffer memory 518. When a complete block is provided to the buffer memory 518, that block will be ready to be released out to a host 522. In one embodiment, the buffer memory 518 may be any suitable storage medium, such as a random access memory (RAM), dynamic random access memory (DRAM), etc.

As mentioned earlier, the data stream 302 and the subcode stream 304 are often times not being processed at the same time once the MSF's for the data frame 203 and the subcode frame 204 are detected. As pictorially illustrated in this example, the subcode stream 304 may be leading the data stream 302 by several frames, and therefore, the subcode frames 204 will be encountered before the data frames 203. Consequently, the DS counter 404 will begin counting up before the DD counter 402. Although these components are counted at different times, the microprocessor unit 520 will preferably not release a block (i.e., a "block" having a matching data frame 203, a subcode frame 204 and a passing C3 ECC component) from the memory buffer 518 until all of its components are received.

The disc drive system 500 also includes an error detection and correction (EDAC) unit 519 that is responsible for checking the C3 ECC to ascertain whether any errors are present. For example, if an error is detected, the EDAC unit 519 will not increment the E counter 406. However, when the EDAC produces a good C3 ECC, the buffer manager 516 will increment the E counter 406 for a current block. The processing performed by the disc drive system 500 will now be described in greater detail with reference to a status table shown in FIG. 5B.

Figure 5B:
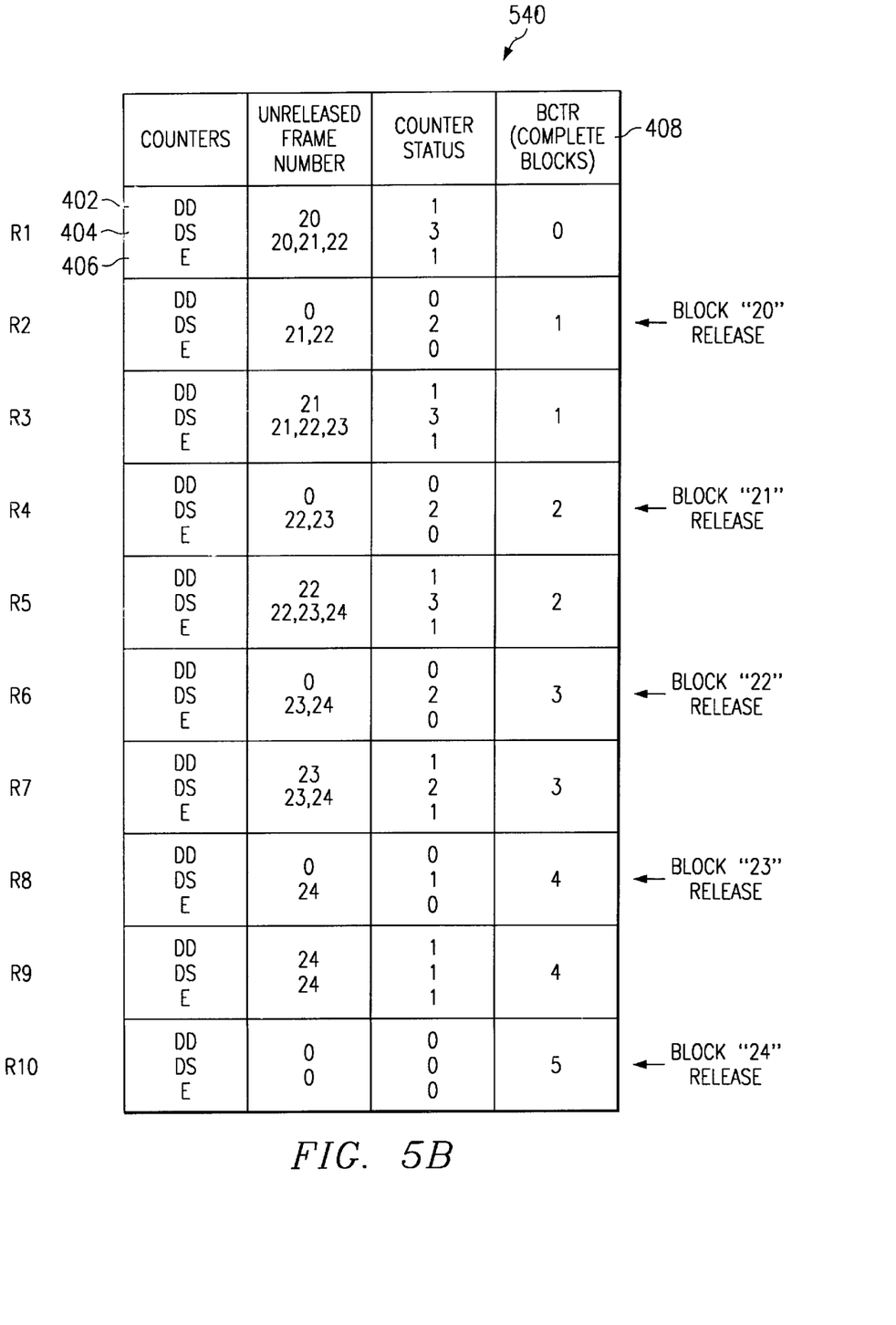
FIG. 5B is a table that shows the exemplary processing performed by the disc drive system in accordance with one embodiment of the present invention.

FIG. 5B is a table 540 that shows the exemplary processing performed by the disc drive system 500 in accordance with one embodiment of the present invention. The table 540 is partitioned into four columns, where the first column from the left identifies the counters DD 402, DS 404, and E 406. The second column identifies the number of unreleased frame numbers with respect to the exemplary reading of frame numbers 20–24 as shown in FIG. 3 above. The third column indicates the status of each counter by identifying the number of data frames 203, subcode frames 204 and passing C3 ECC for a given block.

The fourth column identifies the number of complete blocks that are contained within the buffer memory 518 of FIG. 5A, and which are available for release to the host 522. For simplicity, the description of the values contained in the table 540 will be described sequentially beginning with row 1 (R1) through row 10 (R10), and with reference to the exemplary data stream 302 and subcode stream 304 of FIG. 3. Referring to R1, DD counter 402 will begin once a data MSF for the 20th data frame 203 is found, thereby incrementing the DD counter 402 to 1 as shown in the counter status column. In a like manner, the DS counter 404 will already have been incremented three times for each of subcode frames 20, 21, and 22, by the time the data frame 20 was encountered. This is because the subcode stream 304 is ahead of the data stream 302 in this example. As a result, the counter status for the DS counter 404 is shown incremented up to 3. Of course, in another example, the data stream 302 may alternatively be leading the subcode stream 304.

In row 1, the E counter 406 will be incremented to 1 if the block associated with data frame 20 and subcode frame 20 pass the C3 ECC test performed by the error detection and correction unit 519 (EDAC). Accordingly, now that the counter status for DD is 1, DS is 3, and E is 1, the buffer manager 516 will allow data frame 20 and subcode frame 20 to be released as shown in row 2 (R2).

When this happens, the unreleased data frame 20 and the unreleased subcode frame 20 are no longer shown to be unreleased in the second column, and the counter status for the DD counter 402 is decremented by 1, the DS counter 404 is decremented by 1, and the E counter is decremented by 1. Further shown in R2 is a 1 in the DCTR 408 counter, indicating that one complete block (i.e., 20) is now releasable to the host 522.

Turning next to row 3, the next data frame 21 and the next subcode frame 23 will be transferred in, and will cause the counters to be incremented by 1 as shown in the counter status column. Next, in row 4, now that all of the components for block 21 are present in the buffer memory 518, a block release occurs for data frame 21 and subcode frame 21. As such, the DCTR 408 counter is incremented by 1, and the counter status for the DD counter 402, the DS counter 404 and the E counter 406 are decremented by 1.

Next, the data frame 22 and the subcode frame 24 will be transferred in as shown in the unreleased frame number column, and therefore, the counter status is incremented by 1 for the DD counter 402, the DS counter 404 and the E counter 406. Of course, this assumes that the C3 ECC has passed error free. Once all of the components for data frame 22 and subcode frame 22 are present and valid, we move to row 6 (R6) where block 22 is released, thereby decrementing the DD counter 402, the DS counter 404 and the E counter 406. Accordingly, when these counters are decremented, the BCTR 408 counter is incremented by 1 to signify that there are 3 releasable blocks in the buffer memory 518. In row 7 (R7), the next data frame 23 is transferred in, which increments the DD counter 402 by 1, however, the DS counter 404 is not incremented anymore because it is finished transferring in the desired subcode frames 20–24.

As described above, if the C3 ECC is good, the E counter 406 will also be incremented to 1, which completes the components for data frame 23 and subcode frame 23. Therefore, in row 8 (R8), the data frame 23 and the subcode frame 23 are released, and the BCTR 408 counter is incremented by 1, as well as decrementing the DD counter 402, the DS counter 404, and the E counter 406.

In row 9 (R9), the next data frame 24 is transferred in, thereby incrementing the DD counter 402 to 1, and the E counter 406 is incremented to 1 if the C3 ECC is good. At this point, the counter status indicates that all components are present for the remaining unreleased data frame 24 and unreleased subcode frame 24. At this point, in row 10 (R10), data frame 24 and subcode frame 24 are released, thereby incrementing the BCTR 408 counter. As shown, the BCTR 408 counter is now registering "5", signifying that complete releasable blocks 20, 21, 22, 23, and 24 are contained within the buffer memory 518 and are available to the host 522.

In a like manner, the counter status column indicates that there are no more unreleased frame numbers, and therefore, the counter status of the DD counter 402, the DS counter 404 and the E counter 406 are at "0". Accordingly, at this point, the transfer of all frames has been completed, thereby releasing the data frames and the subcode frames together as "a group" without introducing offsets.

Figure 5C:
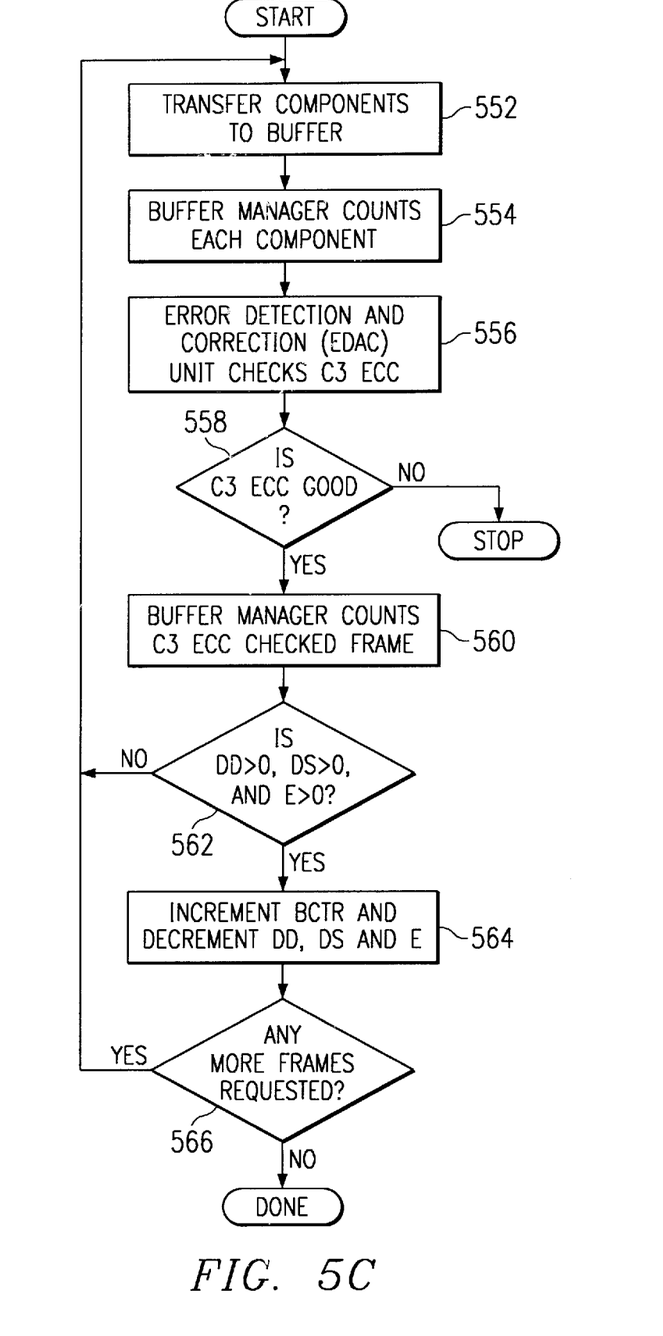
FIG. 5C is a flowchart diagram illustrating the preferred method operations performed by the disk drive system of FIG. 5A in accordance with one embodiment of the present invention.

FIG. 5C is a flowchart diagram illustrating the preferred method operations performed by the disk drive system 500 of FIG. 5A in accordance with one embodiment of the present invention. The method begins at an operation 552 where a transfer of components begins to the buffer memory 518. As described above, the data stream 302 and the subcode stream 304 may not be synchronized, and therefore either a data frame 203 or a subcode frame 204 will be transferred before the other. Once the transfer of components to the buffer has begun in operation 522, the method will proceed to an operation 554 where the buffer manager 516 of FIG. 5A counts each component being stored in the buffer memory 518.

As mentioned above, the DD counter 402 will count the data frames 203, and the DS counter 404 will count the subcode frames 204. Once the buffer manager proceeds with the counting of each component (i.e., the data component and the subcode component) in operation 554, the method will proceed to an operation 556 where an error detection and correction (EDAC) will be performed, such that the EDAC will check the C3 ECC result. The method will then proceed to a decision operation 558 where it is determined whether the C3 ECC is good. In other words, this operation determines whether the data being transferred has good integrity.

If the C3 ECC is not good, the method will stop, signifying that there is an error in the data be transferred. On the other hand, if it determined in operation 558 that the C3 ECC is good, the method will proceed to an operation 560 where the buffer manager 516 counts the C3 ECC checked frames. For example, if the C3 ECC is good, the E counter 406 will increment by 1 as described above. Next the method will proceed to a decision operation 562 where it is determined whether the DD counter 402 is greater than zero, the DS counter is greater than zero, and the E counter is greater than zero. If they are all greater than zero (e.g., as shown in R1, R3, R5, R7, and R9 of the table 540 in FIG. 5B), the method will proceed to an operation 564.

In operation 564, the BCTR counter 408 will be incremented, and the DD counter 402, the DS counter 404 and the E counter 406 will each be decremented by 1. As shown in FIG. 5B, rows R2, R4, R6, R8, and R10, each increment the BCTR 408 counter by 1 (e.g., indicating that the block has its components and is now releasable), and the counter status of each counter DD, DS, and E are decremented by 1. The method will then proceed to a decision operation 566 where it is determined whether any more frames are requested to be transferred. By way of example, if 5 frames are desired to be transferred as shown in FIG. 3, this process will proceed back through operations 552 to 564 until all 5 complete blocks have been designated as releasable. When it is determined in decision operation 566 that there are no more frames desired to be transferred at this point, the method will be done.

The present invention may be implemented using any type of integrated circuit logic, state machines, or software driven computer-implemented operations. By way of example, a hardware description language (HDL) based design and synthesis program may be used to design the silicon-level circuitry necessary to appropriately perform the data and control operations in accordance with one embodiment of the present invention. By way of example, a VHDL® hardware description language available from IEEE of New York, New York may be used to design an appropriate silicon-level layout. Although any suitable design tool may be used, another layout tool may include a hardware description language "Verilog®" tool available from Cadence Design Systems, Inc. of Santa Clara, Calif.

The invention may also employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 6:
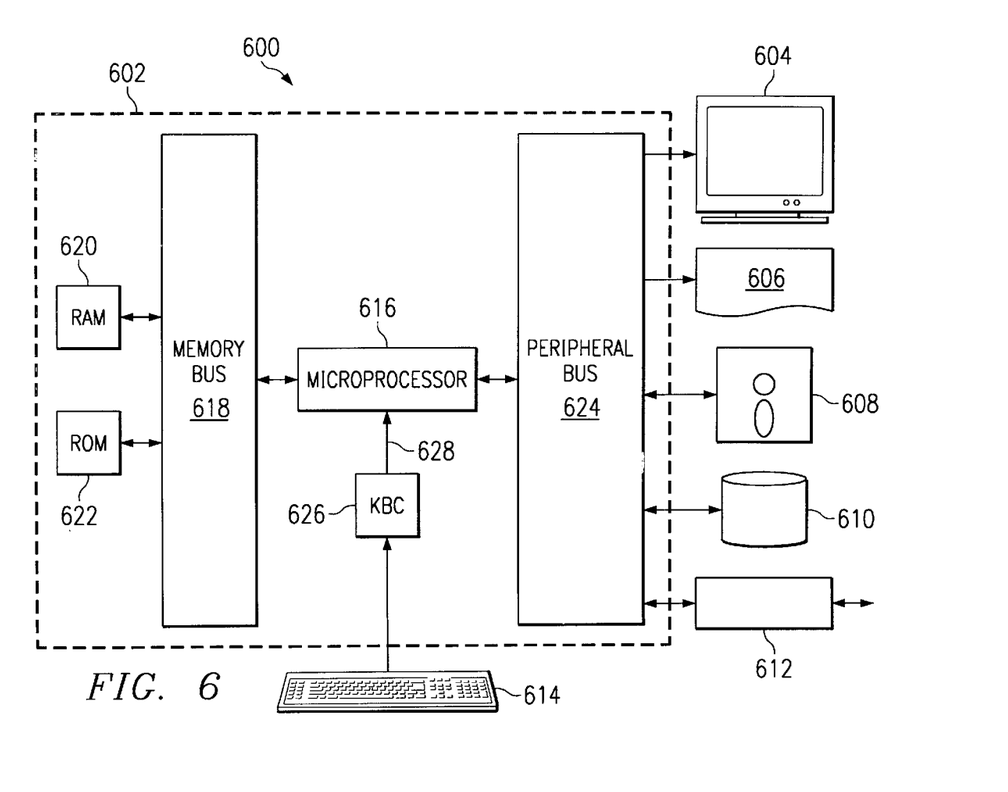
FIG. 6 is a block diagram of an exemplary computer system for carrying out some of the processing according to the invention.

FIG. 6 is a block diagram of an exemplary computer system 600 for carrying out the processing according to the invention. The computer system 600 includes a digital computer 602, a display screen (or monitor) 604, a printer 606, a floppy disk drive 608, a hard disk drive 610, a network interface 612, and a keyboard 614. The digital computer 602 includes a microprocessor 616, a memory bus 618, random access memory (RAM) 620, read only memory (ROM) 622, a peripheral bus 624, and a keyboard controller 626. The digital computer 600 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 616 is a general purpose digital processor which controls the operation of the computer system 600. The microprocessor 616 can be a single-chip processor or can be implemented with multiple components. Using instructions retrieved from memory, the microprocessor 616 controls the reception and manipulation of input data and the output and display of data on output devices. According to the invention, a particular function of microprocessor 616 is to assist in the delayed block release processing.

The memory bus 618 is used by the microprocessor 616 to access the RAM 620 and the ROM 622. The RAM 620 is used by the microprocessor 616 as a general storage area and as scratch-pad memory, and can also be used to store input data and processed data. The ROM 622 can be used to store instructions or program code followed by the microprocessor 616 as well as other data.

The peripheral bus 624 is used to access the input, output, and storage devices used by the digital computer 602. In the described embodiment, these devices include the display screen 604, the printer device 606, the floppy disk drive 608, the hard disk drive 610, and the network interface 612. The keyboard controller 626 is used to receive input from keyboard 614 and send decoded symbols for each pressed key to microprocessor 616 over bus 628.

The display screen 604 is an output device that displays images of data provided by the microprocessor 616 via the peripheral bus 624 or provided by other components in the computer system 600. The printer device 606 when operating as a printer provides an image on a sheet of paper or a similar surface. Other output devices such as a plotter, typesetter, etc. can be used in place of, or in addition to, the printer device 606.

The floppy disk drive 608 and the hard disk drive 610 can be used to store various types of data. The floppy disk drive 608 facilitates transporting such data to other computer systems, and hard disk drive 610 permits fast access to large amounts of stored data.

The microprocessor 616 together with an operating system operate to execute computer code and produce and use data. The computer code and data may reside on the RAM 620, the ROM 622, or the hard disk drive 610. The computer code and data could also reside on a removable program medium and loaded or installed onto the computer system 600 when needed. Removable program mediums include, for example, CD-ROM, PC-CARD, floppy disk and magnetic tape.

The network interface 612 is used to send and receive data over a network connected to other computer systems. An interface card or similar device and appropriate software implemented by the microprocessor 616 can be used to connect the computer system 600 to an existing network and transfer data according to standard protocols.

The keyboard 614 is used by a user to input commands and other instructions to the computer system 600. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system for processing information, comprising:
a storage interface circuit;
a data trigger circuit, coupled to the storage interface circuit, the data trigger circuit configured to detect when a data frame with a desired identification code is available for transfer from the storage interface to a buffer memory;
a subcode trigger circuit, coupled to the storage interface circuit, the subcode trigger circuit configured to detect when a subcode frame with the desired identification code is available for transfer from the disc interface to the buffer memory; and
a block release circuit, coupled to the data and subcode trigger circuits, the block release circuit detecting when a complete block including the data frame and the subcode frame is available for release from the buffer memory.

2. The system as recited in claim 1, further comprising:
an error circuit indicating whether the complete block has good integrity.

3. The system as recited in claim 1, where in the complete block is released from the buffer memory and made available to a host.

4. The system as recited in claim 1, wherein the block release circuit includes a data frame counter, a subcode frame counter, an event counter, and a complete block counter.

5. The system as recited in claim 1, further including an error detection and correction unit used to check a C3 ECC result to ascertain data integrity.

6. The system as recited in claim 1, wherein the data transfer to the buffer memory begins after the data trigger circuit detects the data frame is available.

7. The system as recited in claim 1, wherein the subcode transfer to the buffer memory begins after the subcode trigger circuit detects the subcode frame is available.

8. The system as recited in claim 1, wherein the data trigger circuit and the subcode trigger circuit are implemented in state machine circuits.

9. The system as recited in claim 1, wherein the storage medium is a compact disc (CD) or a digital versatile disc (DVD).

10. The system as recited in claim 9, wherein the storage interface circuit is capable of reading from the storage medium.

11. The system as recited in claim 10, wherein the storage interface circuit is also capable of recording to the storage medium.

12. The system as recited in claim 1, wherein the block release circuit includes a data frame counter and a subcode frame counter.

13. The system as recited in claim 2, wherein the storage interface receives the data frame and the subcode frame from a digital signal processor.

14. The system as recited in claim 2, wherein if data/subcode synchronization is disabled, the block release detection will not be used and instead, the data frame will be released with a subcode frame closely related in time to the data frame.

15. The system of claim 1 further comprising:
- a microprocessor coupled to a memory bus and a peripheral bus;
- a memory device coupled to the memory bus;
- a display device coupled to the peripheral bus;
- an input device coupled to the peripheral bus; and
- a storage sub-system including a storage medium, said storage interface circuit, said data trigger circuit, said subcode trigger circuit, and said block release circuit.

16. The data processing system of claim 15 wherein the desired identification code is provided by the microprocessor.

17. The data processing system of claim 15 wherein the storage medium is a compact disc (CD).

18. The data processing system of claim 15 wherein the storage medium is a digital versatile disc (DVD).

19. The data processing system of claim 15 wherein, in response to a request for information from the storage medium, the microprocessor sends the desire identification code to the storage sub-system and receives in response the requested information.

* * * * *